Nov. 11, 1930. R. J. PATON 1,781,522
DIRECTION AND MOVEMENT INDICATOR FOR USE ON VEHICLES
Filed Feb. 19, 1930 2 Sheets-Sheet 1

Inventor:
R. J. Paton,
By Byrnes, Stebbins, Parmelee & Blenko
Attys.

Nov. 11, 1930.  R. J. PATON  1,781,522
DIRECTION AND MOVEMENT INDICATOR FOR USE ON VEHICLES
Filed Feb. 19, 1930  2 Sheets-Sheet 2
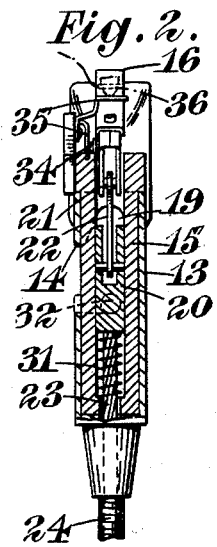
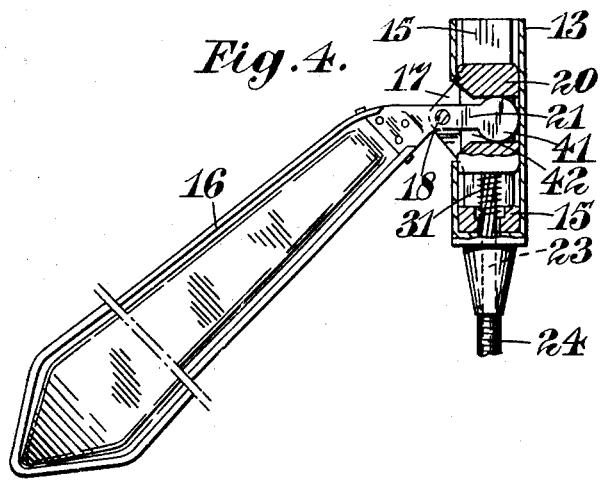
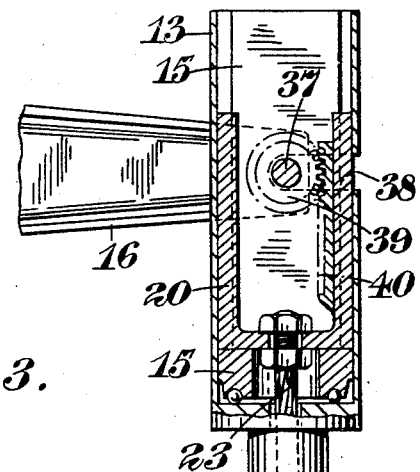
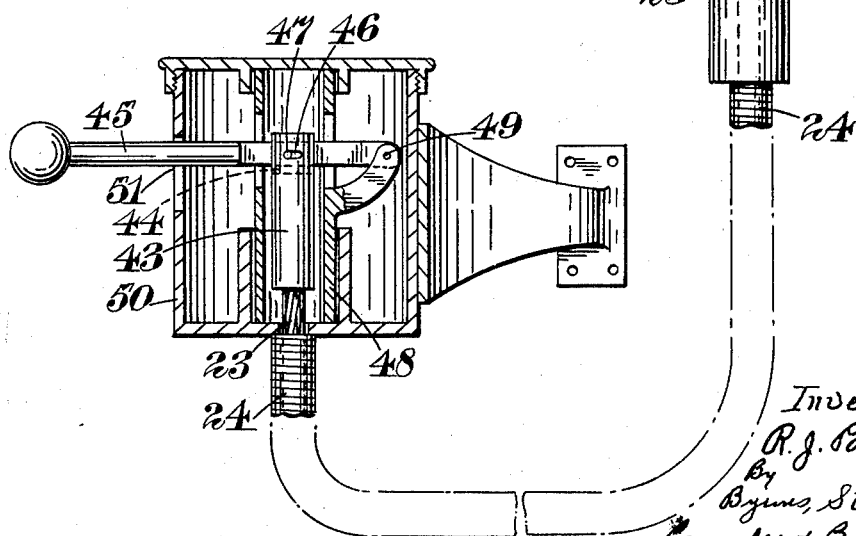
Inventor:
R. J. Paton
By
Byrnes, Stebbins,
Parmelee & Blenko Atty Patented Nov. 11, 1930

1,781,522

UNITED STATES PATENT OFFICE

ROBERT JAMES PATON, OF LONDON, ENGLAND

DIRECTION AND MOVEMENT INDICATOR FOR USE ON VEHICLES

Application filed February 19, 1930, Serial No. 429,624, and in Great Britain February 27, 1929.

This invention relates to direction and movement indicators of the type employed on vehicles and comprising an indicating arm which is mounted on a base part so as to swing both about a substantially vertical axis and about a substantially horizontal axis and a single operating shaft which may be a flexible shaft and which is so coupled to the indicating arm that rotational movement of the shaft moves the arm about one of said axes and axial movement of the shaft moves the arm about the other of said axes.

With indicators of this type the driver of the vehicle can make any of the recognized hand signals including the "stop" signal which is given by moving the indicating arm up and down in a vertical plane and the "overtake" or "turn left" signal which is given by moving the arm to and fro in a horizontal direction. It is the object of this invention to provide a simple operating means of indicators of this kind.

According to the present invention an indicator of the above type comprises a support on which the indicating arm is mounted to swing about one of said axes and which is itself mounted on said base part to pivot about the other of said axes, a slider which is mounted on the support so as to be fixed thereto as regards rotation but to be free to slide relatively thereto in the direction of the length of the pivotal axis of the support and which is connected to the operating shaft to move bodily therewith and to transmit turning movement therefrom to the support, and an operative connection between the slider and the arm such that sliding movement of the former along the length of the axis of the support causes the arm to swing relatively to the support. The slider may be connected to the arm by a link or by a rack and pinion gear or by a pin and slot connection.

Three constructions embodying these and other features of the invention will now be described, by way of example only, with reference to the accompanying drawings in which:—

Figure 2 is a cross-section on the line 2—2 of Figure 1;

Figure 3 is a cross-section showing, in elevation, the operating parts of the second construction, and Figure 4 is a cross-section showing, in elevation, the operating parts of the third construction.

Like reference numerals indicate like parts throughout all the figures of the drawings.

Figure 1:
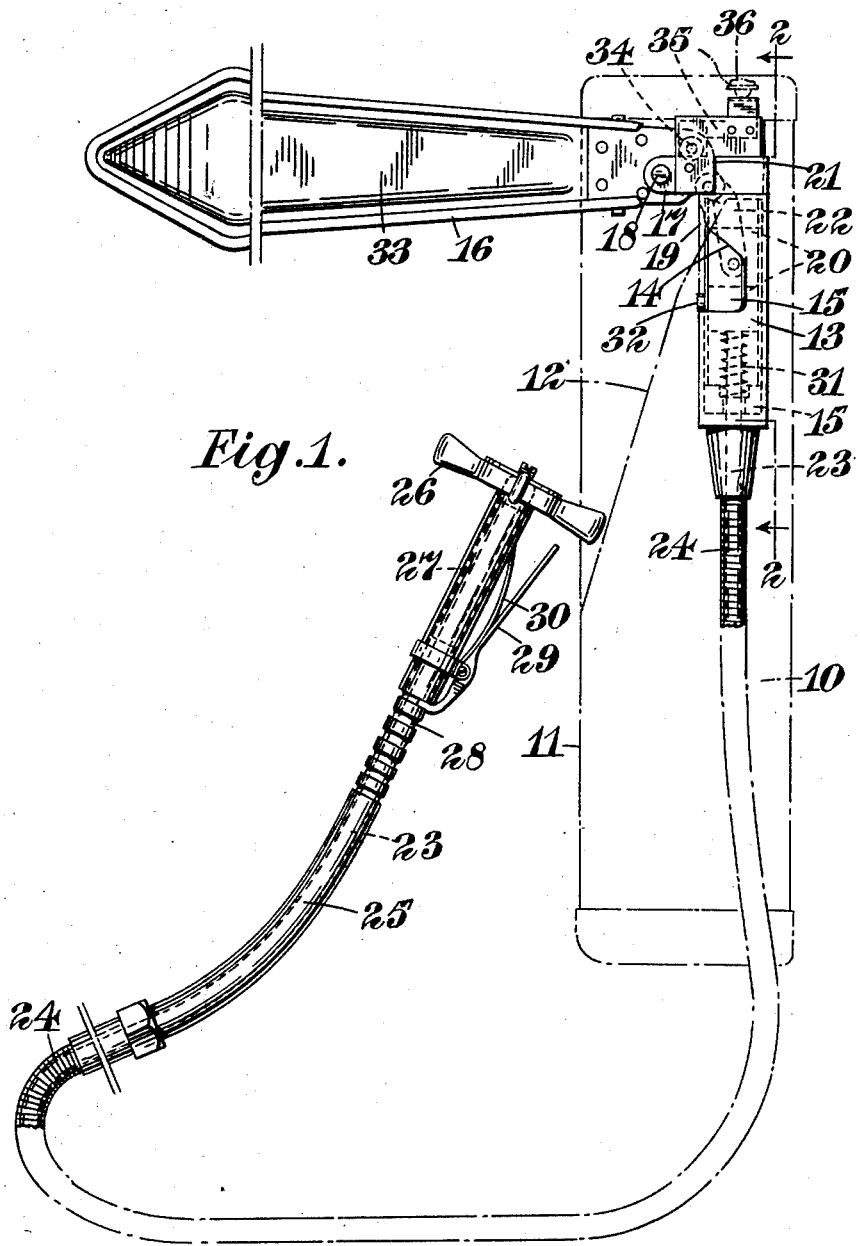
Figure 1 shows the first construction in elevation.

Referring first to Figures 1 and 2 the indicator includes a casing indicated in chain lines at 10 which is adapted to be secured to the off-side of the vehicle so as to be visible to other road-users. It will be understood that the indicator may be arranged for attachment to the near side of the vehicle. The vertical side 11 of the casing is open and the casing is cut away as shown at 12. A tubular base part 13 is secured within the casing and is formed with a cam slot 14. A cylindrical support 15 carries an indicating arm 16 and is rotatably received within the base part. The support projects above the base part and is formed, on its projecting portion, with two lugs 17 on which the arm 16 is pivotally mounted at 18. The support is further formed with a parallel-sided slot 19 in which a slider 20 is received. The slider 20 is connected to a rearward extension 21 of the arm by a link 22 which is pivotally connected to the arm and to the slider, and is also secured to one end of a flexible shaft 23 the outer casing 24 of which is secured to the base part 13. It will be seen that if the shaft 23 is moved axially so as to move the slider upwards from the position shown in Figures 1 and 2, the arm will be turned about its pivot 18 owing to the link connection between the arm and the slider. If the shaft 23 is twisted, the slider will be turned and will act as a driving member for the support 15 which will turn and cause the arm 16 to turn about a vertical axis.

The other end of the shaft 23 extends through a tube 25, which is secured to any convenient part (e. g. the steering column) inside the vehicle, and is secured to a handle 26. The handle is formed with a sleeve portion 27 by which it is mounted on the end of the tube 25 and has a finger lever 29 pivotally mounted on it. The tube is formed with a plurality of annular grooves 28 with one of which the end of the lever 29 is engaged by a spring 30. It will be seen that the shaft can be twisted by turning the handle and can be moved axially by disengaging the lever 29 from the grooves and sliding the handle in or out. A spring 31 surrounds the shaft 23 between the bottom of the slider and the base of the support and tends to raise the slider so as to return the arm to its inoperative position within the casing. As the arm may not be in alignment with the open side 11 of the casing when the spring 31 acts to return it to its normal position, the slider is provided with a pin 32 which co-operates with the cam slot 14. It will be seen from Figure 1 that, if the arm is turned through 90° about a vertical axis and the handle is released, the spring 31 will raise the slider until its pin 32 engages the cam slot 14. Then, as the slider is raised further, it will be turned by the cam slot and will rotate the support and therefore the arm until the latter is in alignment with the open side 11 of the casing.

The arm 16 is hollow to receive an electric bulb and its side walls 33 are of celluloid. Current is supplied to the bulb by a single wire circuit, one terminal of the bulb holder being earthed and the other connected to a contact 34 mounted on the arm. This contact co-operates with a spring contact 35 which is carried by one of the lugs 17 and which engages a contact 36 fixed to the casing 10 above the axis of the support. The contact 35 is so shaped as to be disengaged from the contact 34 while the arm is in the casing 10 and to engage the contact 34 as soon as the arm is raised out of the casing.

The construction shown in Figure 3 is generally similar to that shown in Figures 1 and 2. The arm 16 is mounted in a spindle 37 which extends through a slot 38 in the base part 13 and is mounted to rotate in the support 15. A pinion 39 is secured to the spindle and meshes with an internal rack 40 in the slider 20 which is U-shaped. It will be seen that sliding movement of the slider causes the pinion and therefore the arm to turn while a turning movement of the slider is communicated to the support 15.

In Figure 3 an alternative form of hand-control is shown. The shaft 23 is secured to one end of a slider 43, the opposite end of which is slotted at 44. A hand-lever 45 passes through this slot and is connected to the slider by a pin 47 carried by it entering slots 46 formed in the slider. The hand-lever is pivoted at 49 to a sleeve 48 surrounding the slider, and received within a casing 50. The handle projects through a suitable opening 51 in the casing 50. When the lever is raised or lowered, the slider and therefore the shaft 23 is moved axially, while when the lever is turned about the axis of the slider, the latter and the shaft 23 are turned.

In the construction shown in Figure 4, the arm 16 is pivotally mounted at 18 on lugs 17 of the support 15, the lugs projecting through an opening in the base part 13. The arm is formed with a rearward extension 21 which is inclined at 45° to the length of the arm and is formed with a circular end portion 41. The end portion 41 is located within a slot 42 in the slider 20 and engages the top and bottom of the slot simultaneously. The operation of this construction is similar to that shown in Figures 1 and 2.

In the constructions illustrated, the arm is arranged for movement through an angle of 90° about either axis but it will be understood that the arm may be arranged to move through 180° or any other desired angle.

Further, the pivotal axis of the support may be horizontally disposed instead of being vertically disposed, as illustrated.

I claim:—

1. A direction and movement indicator of the type specified comprising an indicating arm arranged to swing both about a substantially horizontal axis and about a substantially vertical axis, a support in which the indicating arm is mounted at one end to extend transversely to and to swing about one of said axes, a base part on which the support is mounted to pivot about the other of said axes, a slider which is mounted on the support so as to be fixed therein as regards rotation but to be free to slide relatively thereto in the direction of the length of the pivotal axis of the support, a single operating shaft so connected to the slider as to transmit linear and rotary movement thereto, and an operative connection between the slider and the arm such that the sliding movement of the former causes the latter to swing relatively to the support.

2. A direction and movement indicator for vehicles comprising a movable indicating arm, a support in which the arm is mounted at one end to swing about a substantially horizontal axis transverse to the length of the arm, a base part in which the support is mounted to pivot about a vertical axis, a slider which is mounted on the support so as to be fixed thereon as regards rotation about said vertical axis but free to slide relatively thereon in the direction of the vertical axis, a single operating shaft so connected to the slider as to transmit linear and rotary movement thereto, an operative connection between the slider and the arm such that the sliding movement of the former causes the latter to swing relatively to the support, and a spring tending to so move the slider relatively to the support as to cause the arm to assume an inoperative substantially vertical position.

3. A direction and movement indicator for vehicles comprising a movable indicating arm, a support in which the arm is mounted to swing about a substantially horizontal axis, a base part in which the support is mounted to pivot about a vertical axis, a slider which is mounted on the support so as to be fixed thereon as regards rotation about said vertical axis but free to slide relatively thereon in the direction of the vertical axis, a single operating shaft so connected to the slider as to transmit linear and rotary movement thereto, an operative connection between the slider and the arm such that the sliding movement of the former causes the latter to swing relatively to the support, a spring tending so to move the slider relatively to the support as to cause the arm to assume an inoperative substantially vertical position, a casing within which the arm is received in its inoperative position and into which it can enter by a movement substantially in a predetermined vertical plane, a cam, and a co-operating follower, one of which two parts is carried by the slider and the other by the base part and which cam is so shaped as to cause the support to turn about its pivotal axis and bring the arm into said vertical plane if the arm is not already in said plane and as the slider moves under the action of the spring.

4. A direction and movement indicator of the type specified comprising an indicating arm arranged to swing both about a substantially horizontal axis and about a substantially vertical axis, a support in which the indicating arm is mounted at one end to extend transversely and to swing about one of said axes, a base part on which the support is mounted to pivot about the other of said axes, a slider which is mounted on the support so as to be fixed therein as regards rotation but to be free to slide relatively thereto in the direction of the length of the pivotal axis of the support, a single operating shaft so connected to the slider as to transmit linear and rotary movement thereto, and a link operatively connected to the slider and the arm so that the sliding movement of the former causes the latter to swing relatively to the support.

5. A direction and movement indicator of the type specified comprising an indicating arm arranged to swing both about a substantially horizontal axis and about a substantially vertical axis, a support in which the indicating arm is mounted to swing about one of said axes, a base part on which the support is mounted to pivot about the other of said axes, a slider which is mounted on the support so as to be fixed therein as regards rotation but to be free to slide relatively thereto in the direction of the length of the pivotal axis of the support, a single operating shaft so connected to the slider as to transmit linear and rotary movement thereto, a rack provided on the slider, and a co-operating gear member provided on the arm.

6. A direction and movement indicator of the type specified comprising an indicating arm arranged to swing both about a substantially horizontal axis and about a substantially vertical axis, a support in which the indicating arm is mounted to swing about one of said axes, a base part on which the support is mounted to pivot about the other of said axes, a slider which is mounted on the support so as to be fixed therein as regards rotation but to be free to slide relatively thereto in the direction of the length of the pivotal axis of the support, a slot extending through the slider, an integral extension of the arm passing through said slot, and a single operating shaft so connected to the slider as to transmit linear and rotary movement thereto.

7. A direction and movement indicator of the type specified comprising an indicating arm arranged to swing both about a substantially horizontal axis and about a substantially vertical axis, a support in which the indicating arm is mounted to swing about one of said axes, a base part on which the support is mounted to pivot about the other of said axes, a slider which is mounted on the support so as to be fixed therein as regards rotation but to be free to slide relatively thereto in the direction of the length of the pivotal axis of the support, a single operating shaft so connected to the slider as to transmit linear and rotary movement thereto, an operative connection between the slider and the arm such that the sliding movement of the former causes the latter to swing relatively to the support, an operating handle which is secured to said operating shaft, a cylindrical support on which the handle is rotatably and slidably mounted, a plurality of circumferential grooves formed on the support, and a finger lever mounted on the handle and spring pressed into engagement with one of said grooves to resist sliding movement of the handle while allowing rotary movement thereof.

8. A direction and movement indicator for vehicles comprising a movable indicating arm, a support on which the arm is mounted to swing about a substantially horizontal axis, a base part on which the support is mounted to pivot about a vertical axis, a slider which is mounted on the support so as to be fixed thereon as regards rotation about said vertical axis but free to slide relatively thereon in the direction of the vertical axis, a single operating shaft so connected to the slider as to transmit linear and rotary movement thereto, an operative connection between the slider and the arm such that the sliding movement of the former causes the latter to swing relatively to the support, a spring tending so to move the slider relatively to the support as to cause the arm to assume an inoperative substantially vertical position, an operating handle which is secured to said operating shaft, a cylindrical support on which the handle is rotatably and slidably mounted, a plurality of circumferential grooves formed on the support, and a finger lever mounted on the handle and spring pressed into engagement with one of said grooves to resist sliding movement of the handle while allowing rotary movement thereof.

In testimony whereof I affix my signature.
(CAPTAIN) ROBERT JAMES PATON.